March 8, 1949.  G. L. SANDERSEN ET AL  2,464,156
EXPANDING CHUCK OR MANDREL
Filed Feb. 20, 1946
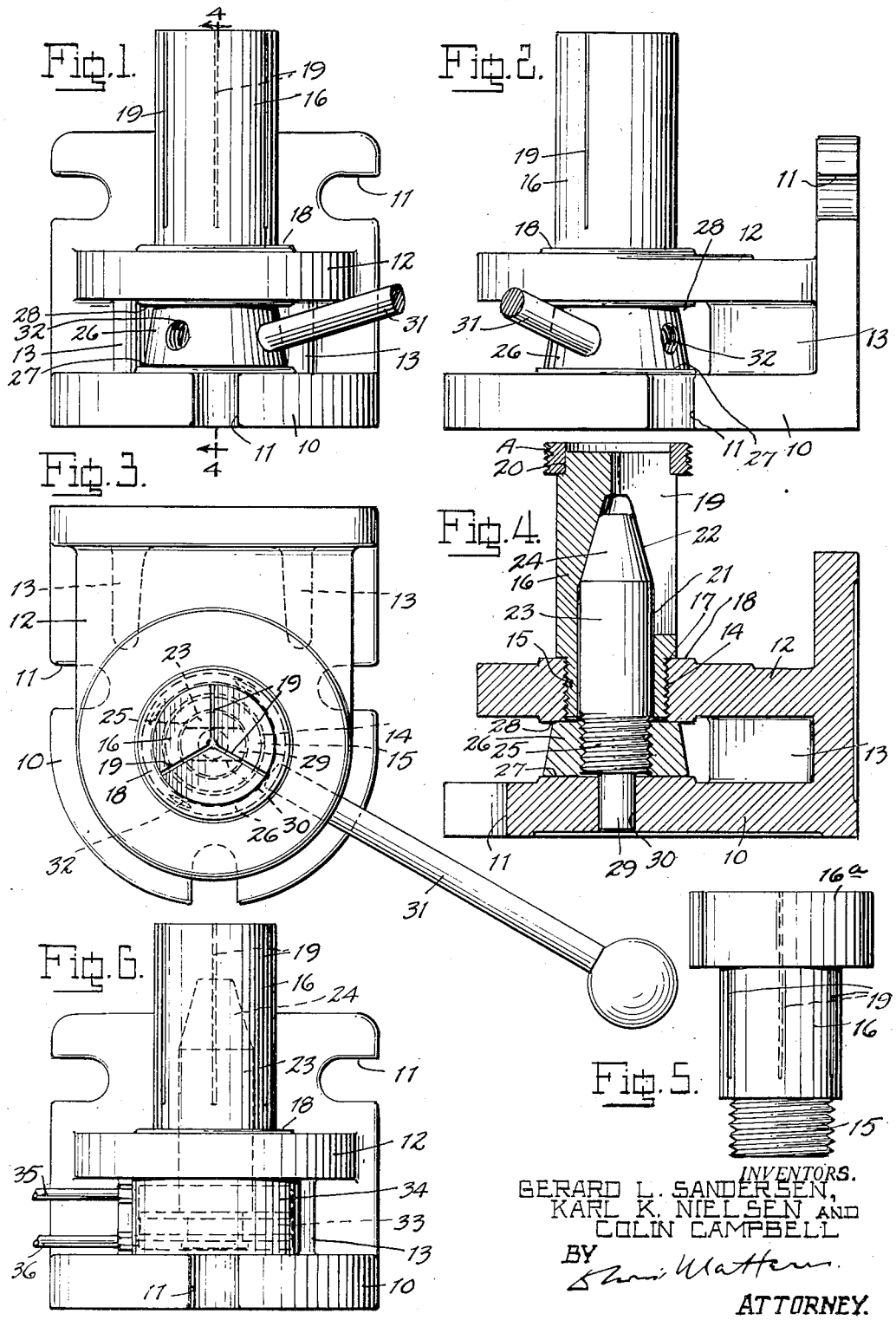
INVENTORS.
GERARD L. SANDERSEN,
KARL K. NIELSEN AND
COLIN CAMPBELL
BY
ATTORNEY.

Patented Mar. 8, 1949

2,464,156

UNITED STATES PATENT OFFICE 2,464,156

EXPANDING CHUCK OR MANDREL

Gerard L. Sandersen, North Haven, and Karl K. Nielsen and Colin Campbell, Essex, Conn.; said Nielsen and said Campbell assignors to said Sandersen Application February 20, 1946, Serial No. 648,944

5 Claims. (Cl. 279—2)

The present invention relates to an expanding chuck or mandrel adapted to engage the inside diameter of work pieces to hold them in a fixed relation on the bed of a machine tool for the purpose of performing a machining operation thereon. An object of the invention is to provide an expanding chuck or mandrel which may be instantaneously operated between its holding and releasing positions, so that it is adapted for high speed production work.

Another object is to provide a removable work holding head, which is adapted to be machined to accommodate work pieces of different sizes, and which may be conveniently replaced by other work holding heads interchangeable therewith, so that by providing a plurality of such work holding heads the device is readily adapted to the holding of a wide variety of work pieces.

Another object is to provide an expanding chuck or mandrel which may be conveniently attached to the bed of the machine tool with the axis of the mandrel in either a vertical or a horizontal position.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a front elevation of an expanding chuck or mandrel, according to one illustrated exemplary embodiment of the invention.

Fig. 2 is a side elevation.

Fig. 3 is a top plan view.

Fig. 4 is a vertical sectional view, taken along the line 4—4 of Fig. 1, and showing a work piece engaged upon the mandrel head.

Fig. 5 is a side elevation of a modified form of work holding head.

Fig. 6 is a front elevation of a modified form of expanding chuck or mandrel having air-cylinder operating means.

Similar reference characters indicate corresponding parts throughout the several figures of the drawings.

Referring to the drawings, and more particularly to Figs. 1 to 4 thereof, the expanding chuck or mandrel, according to the illustrated exemplary embodiment of the invention shown therein, comprises a frame 10 of L-shape in cross-section adapted to be mounted upon the bed of a suitable machine tool with the mandrel either vertically or horizontally disposed, the base and the upright back of the frame being provided with attaching bolt receiving notches 11 for attachment in either the vertical or horizontal position of the mandrel. In parallel spaced relation above the base of the frame there is provided a horizontal shelf 12, projecting forwardly from the upright back of the frame and reinforced to increase the rigidity of the frame by means of web formations 13—13 extending forwardly from the upright back between the base and the shelf of the frame.

The shelf 12 is provided with a threaded hole 14 in which the threaded lower end 15 of the mandrel head 16 is secured, the shoulder 17 at the base of the mandrel head seating firmly upon an annular machined bearing surface 18 of the shelf surrounding the threaded hole 14. The mandrel is preferably formed of cylindrical stock, and is provided with three vertically disposed slits 19 extending downwardly from the upper end into spaced relation with the lower end. Preferably, it is constructed of material which is hardened at the lower end and is relatively soft at the upper end, so that, in general, the slit portion of the mandrel will have a springy action due to the hardening of its lower end portion up to a point substantially above the lower ends of the slits 19, while the upper relatively soft end portion may be conveniently machined, as at 20, to fit the particular work piece to be secured, as for instance, the ring A to be exteriorly threaded. It is pointed out that there is sufficient bulk of material in the mandrel head to permit of it being repeatedly changed at its upper end to secure various sizes of work pieces, and a single mandrel head if desired may have several work receiving portions formed thereon for receiving different diameter work pieces. As shown in Fig. 5 the mandrel head may be formed at its upper end with an increased diameter work holding portion 16$^a$ so that work pieces of substantially larger diameter than the lower end of the mandrel head may be secured thereon.

The mandrel head is provided internally with a cylindrical passage 21 extending upwardly from its lower end and provided at its upper end with an upwardly converging tapered recess 22. Within the passage 21 and recess 22 there is engaged a cylindrical plunger 23 provided at its upper end with an upwardly converging tapered end portion 24 fitting within the tapered recess 22. Thus upward movement imparted to the plunger imparts expanding movement to the mandrel head, downward movement of the plunger permitting the head to contract through the inherent resiliency of its hardened lower portion. The lower end portion of the plunger is provided with screw threads 25 engaged by a rotatable nut 26 disposed between the base of the frame 10 and the shelf 12 and having thrust bearing upon machined annular bearing portions 27 and 28 thereon. The lower end of the mandrel is provided with a non-circular extension 29 engaged in a slot 30 in the base of the frame 10, which prevents rotation of the plunger while permitting it to have vertical reciprocatory movement. Thus rotation of the nut 26 is adapted to impart vertical raising and lowering movement to the plunger, the pitch of the threads 25 being such that relatively little turning force upon the nut is required to impart relatively great expanding force to the plunger. The nut is provided with a removable handle 31 for turning it, and several radially disposed screw holes 32 are provided in the nut to enable the handle to be readily engaged therewith at positions most convenient for the operation of the device. As shown in Fig. 3 the handle is in its position with the mandrel contracted or released. By swinging the handle in clockwise direction the nut is rotated to raise the plunger to expand the mandrel head into its work retaining position.

In Fig. 6 there is shown an alternative form of the invention which consists in providing, instead of the nut and screw for operating the plunger, a piston 34 secured upon the plunger and engaged in an air cylinder 33 mounted between the base of the frame and the shelf 12, and adapted to have compressed air forced above and below the piston by means of conduits 36 and 35, and which may be controlled by a suitable valve of well known type.

We have illustrated and described preferred and satisfactory embodiments of the invention, but it will be understood that changes may be made therein, within the spirit and scope thereof, as defined in the appended claims.

Having thus described our invention, what we claim and desire to secure by Letters Patent is:

1. An expansion mandrel, comprising a frame adapted to be secured to a support or the like, an expansible mandrel head removably secured at its lower end in said frame, said head having radial slits extending longitudinally therethrough from its upper end surface to a point in upwardly spaced relation to its lower end, the side walls of the upper ends of each of said slits being unconnected whereby said slits are free to expand and contract at their upper ends, and having an internal passage extending upwardly therein from its lower end and including an upwardly converging tapered portion, a reciprocating plunger within said passage having a tapered portion engaged with said tapered portion thereof and adapted through upward movement therein to expand the upper end surface of said mandrel head, and means carried by said frame for imparting reciprocatory movement to said plunger.

2. An expansion mandrel, comprising a frame adapted to be secured to a support or the like, an expansible mandrel head removably secured at its lower end in said frame, said head having radial slits extending longitudinally therethrough from its upper end surface to a point in upwardly spaced relation to its lower end, the side walls of the upper ends of each of said slits being unconnected whereby said slits are free to expand and contract at their upper ends, and having an internal passage extending upwardly therein from its lower end and including an upwardly converging tapered portion, the lower portion of said head being relatively hard and having inherent springiness and the upper portion being relatively soft, a reciprocating plunger within said passage having a tapered portion engaged with said tapered portion thereof and adapted through upward movement therein to expand the upper end surface of said mandrel head, and means carried by said frame for imparting reciprocatory movement to said plunger.

3. An expansion mandrel, comprising a frame adapted to be secured to a support or the like, and including a base portion and shelf portion in spaced relation above said base portion, said shelf portion having an aperture, an expansible mandrel head removably secured at its lower end in said aperture of said shelf portion, and having an internal passage extending upwardly therein from its lower end and including an upwardly converging tapered portion, a reciprocating plunger within said passage having a tapered portion engaged with said tapered portion thereof and adapted through upward movement therein to expand said mandrel head, said plunger having a lower threaded portion extended below said shelf portion, and a nut engaged with said threaded portion of said plunger and rotatably confined between said base and shelf portions for imparting reciprocatory movement to said plunger.

4. An expansion mandrel, comprising a frame adapted to be secured to a support or the like, and including a base portion and a shelf portion in spaced relation above said base portion, said shelf portion having an aperture, an expansible mandrel head removably secured at its lower end in said aperture of said shelf portion, and having an internal passage extending upwardly therein from its lower end and including an upwardly converging tapered portion, a reciprocating plunger within said passage having a tapered portion engaged with said tapered portion thereof and adapted through upward movement therein to expand said mandrel head, said plunger having a lower threaded portion extended below said shelf portion, a nut engaged with said threaded portion of said plunger and rotatably confined between said base and shelf portions for imparting reciprocatory movement to said plunger, and interengaged means on said base portion and said plunger adapted to prevent relative rotation of said plunger.

5. An expansion mandrel, comprising a frame adapted to be secured to a support or the like, an expansible mandrel head, removably secured at its lower end in said frame and having an internal passage extending upwardly therein from its lower end and including an upwardly converging tapered portion, a reciprocating plunger engaged within said passage having a tapered portion engaged with said tapered portion thereof and adapted through upward movement therein to expand said mandrel head, and fluid pressure means carried by said frame for imparting reciprocatory movement to said plunger.

GERARD L. SANDERSEN.
KARL K. NIELSEN.
COLIN CAMPBELL.

REFERENCES CITED

The following references are of record in the file of this patent:

UNITED STATES PATENTS

| Number | Name | Date |
|---|---|---|
| 1,147,517 | Lang | July 20, 1915 |
| 1,260,130 | Bemis | Mar. 19, 1918 |
| 1,921,316 | Mattern et al. | Aug. 8, 1933 |
| 1,926,798 | Baumback | Sept. 12, 1933 |
| 2,345,091 | Brace et al. | Mar. 28, 1944 |
| 2,399,831 | Schmidt | May 7, 1946 |
| 2,408,689 | Seme | Oct. 1, 1946 |